United States Patent
Yamazaki

(10) Patent No.: US 8,179,601 B2
(45) Date of Patent: May 15, 2012

(54) COOLING DEVICE FOR A FARADAY ROTATOR OF AN OPTO-ISOLATOR IN A LASER PROCESSING APPARATUS

(75) Inventor: Nobuyuki Yamazaki, Noda (JP)

(73) Assignee: Miyachi Corporation, Chiba (JP)

( * ) Notice: Subject to any disclaimer, the term of this patent is extended or adjusted under 35 U.S.C. 154(b) by 192 days.

(21) Appl. No.: 12/454,695

(22) Filed: May 21, 2009

(65) Prior Publication Data
US 2009/0290213 A1    Nov. 26, 2009

(30) Foreign Application Priority Data

May 22, 2008   (JP) .................................. 2008-134439

(51) Int. Cl.
*G02B 5/30* (2006.01)

(52) U.S. Cl. ............................... 359/484.03; 359/484.02

(58) Field of Classification Search .......................... None
See application file for complete search history.

(56) References Cited

U.S. PATENT DOCUMENTS

| | | | | |
|---|---|---|---|---|
| 3,420,601 A | * | 1/1969 | Graf et al. | 359/282 |
| 3,484,152 A | * | 12/1969 | Robinson | 359/282 |
| 3,523,718 A | * | 8/1970 | Crow | 359/484.03 |
| 3,561,873 A | * | 2/1971 | Hooper | 356/327 |
| 3,602,575 A | * | 8/1971 | Young | 359/484.03 |
| 3,697,151 A | | 10/1972 | Skolnick et al. | |
| 3,781,714 A | * | 12/1973 | Schlossberg | 359/484.04 |
| 5,115,340 A | * | 5/1992 | Tidwell | 359/484.04 |

FOREIGN PATENT DOCUMENTS

| | | | |
|---|---|---|---|
| JP | 01070725 A | * | 3/1989 |
| JP | H6-034926 | | 2/1994 |
| WO | WO 2005/093498 | | 10/2005 |

* cited by examiner

*Primary Examiner* — Arnel C Lavarias
(74) *Attorney, Agent, or Firm* — DLA Piper LLP (US)

(57) ABSTRACT

A Faraday rotator of an opto-isolator in a laser processing apparatus includes a crystal cylinder that causes the Faraday effect, an enclosing tube, cooling tubes, and a magnet. The enclosing tube encases the crystal cylinder. The cooling tubes are sandwiched between the crystal cylinder and the enclosing tube at both ends of the crystal cylinder. The cooling tubes have passages through which a coolant flows. The coolant circulates through a space between the crystal cylinder and the enclosing tube, and the passages, thereby cooling the crystal cylinder.

7 Claims, 4 Drawing Sheets

[Fig.1]
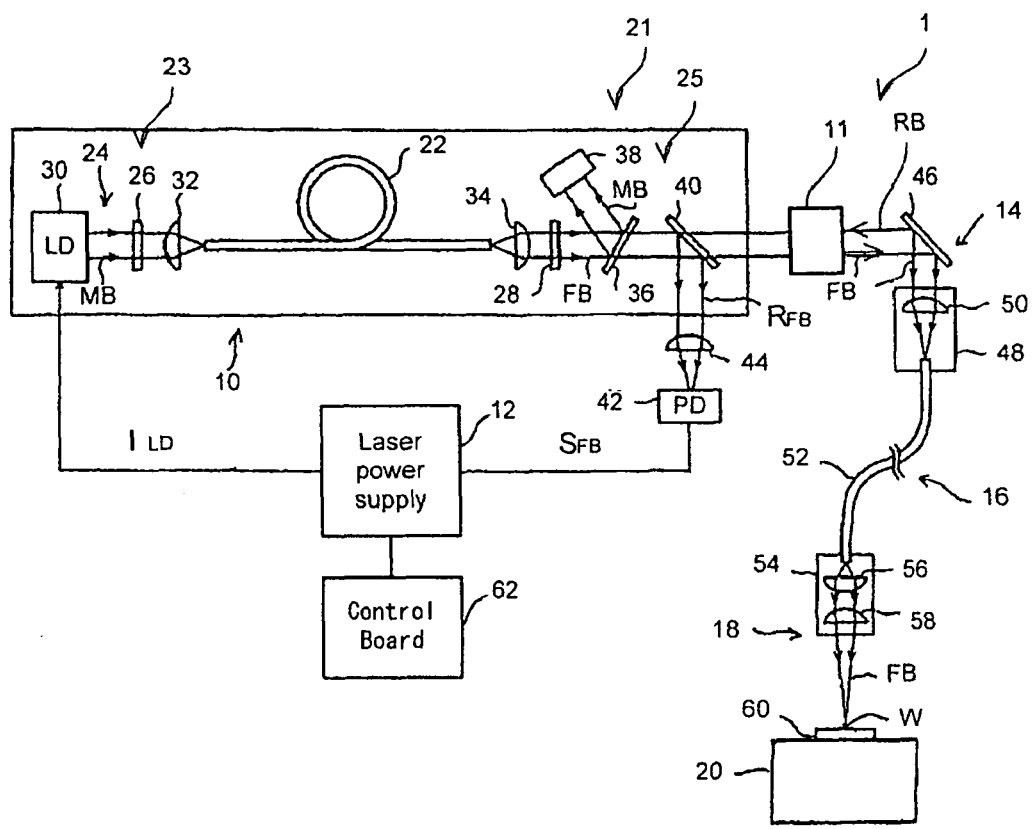
[Fig.2]
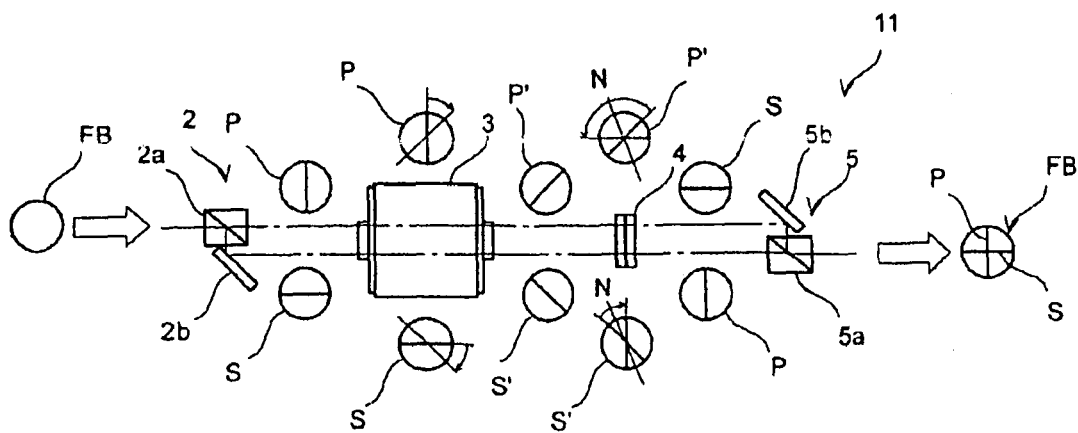

[Fig.3]
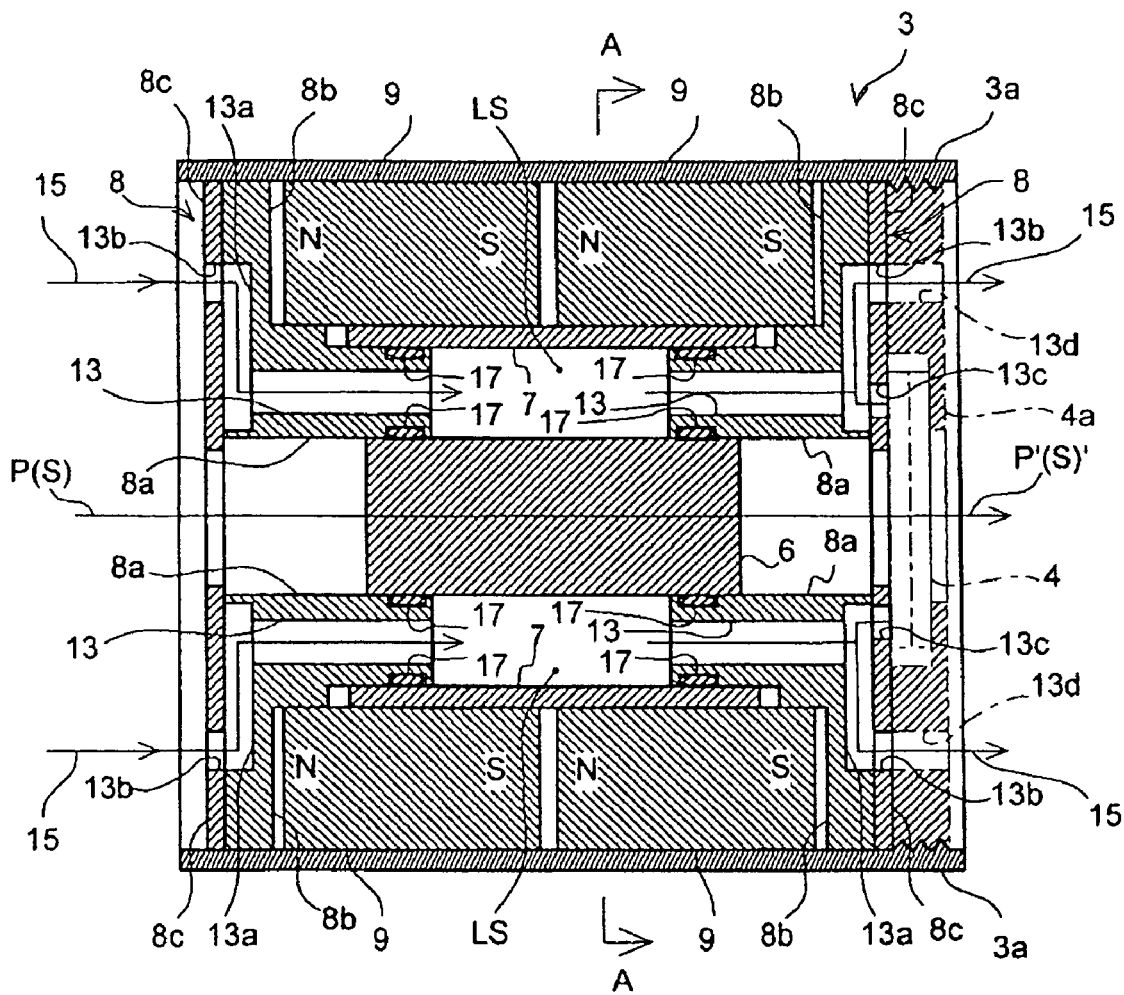

[Fig.4]
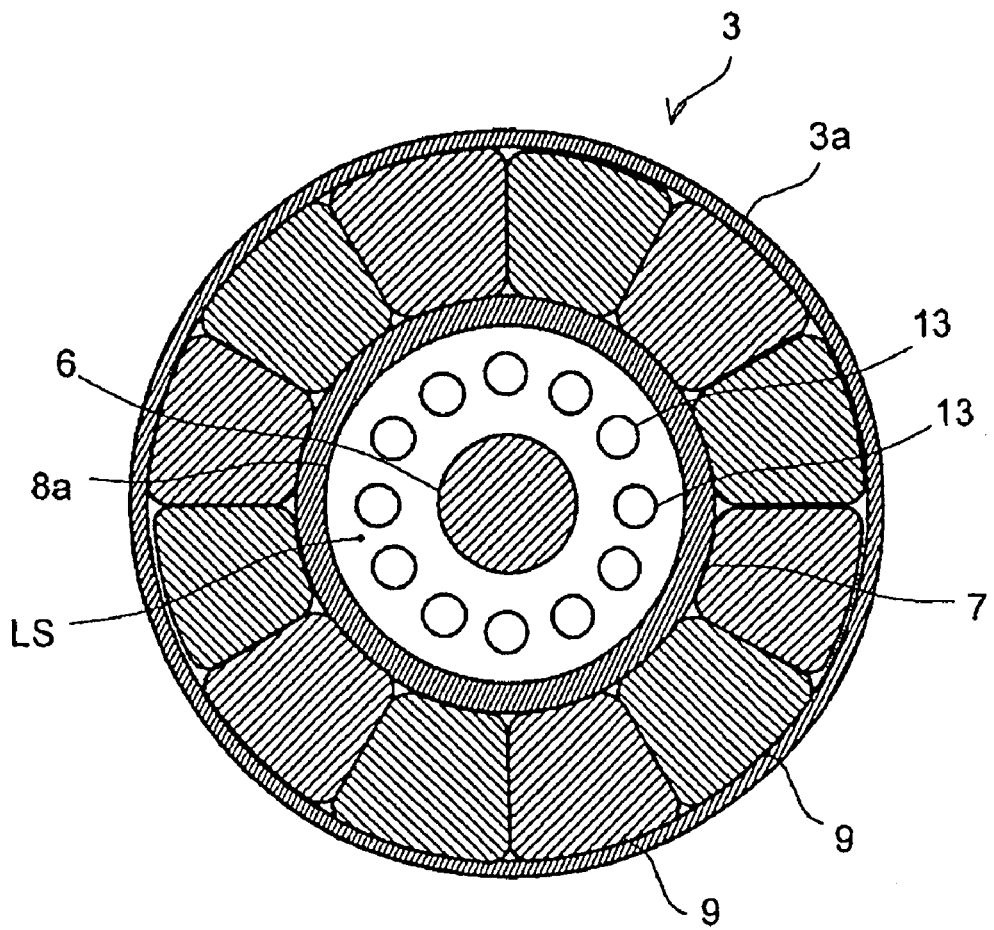
[Fig.5]
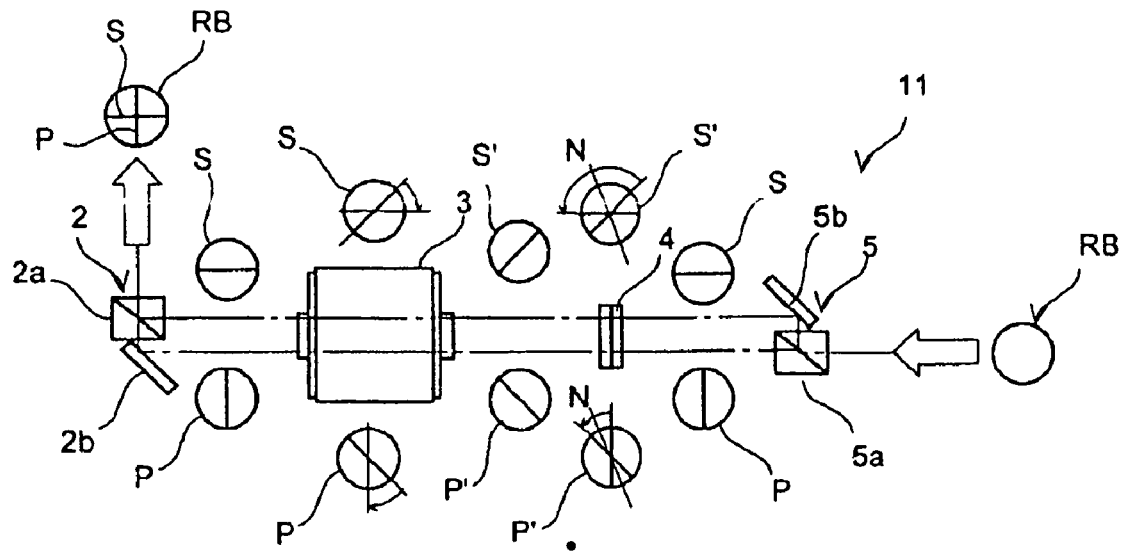

[Fig.6]
RELATED ART
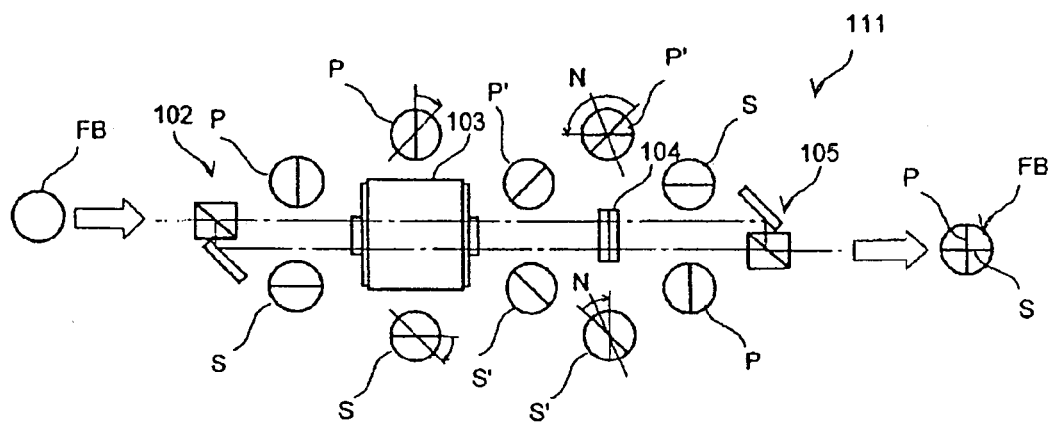
[Fig.7]
RELATED ART
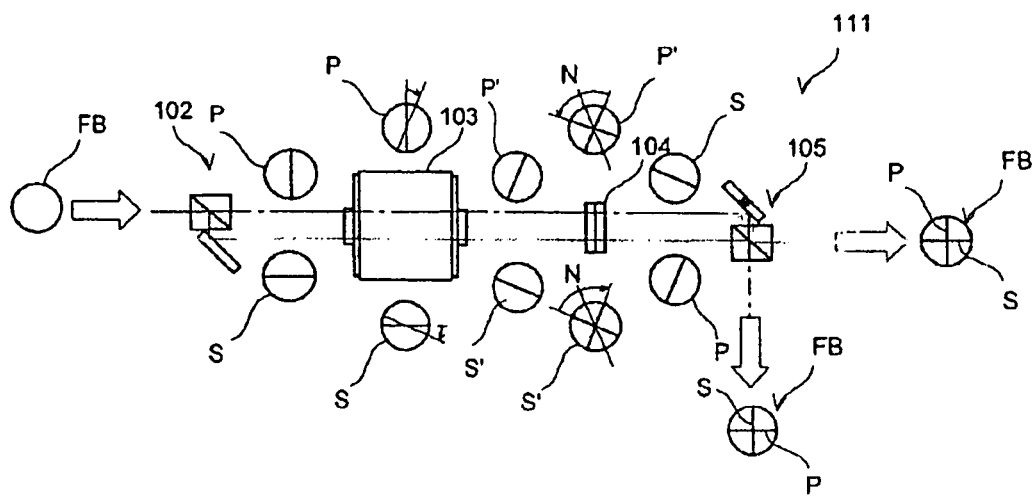

COOLING DEVICE FOR A FARADAY ROTATOR OF AN OPTO-ISOLATOR IN A LASER PROCESSING APPARATUS

BACKGROUND OF THE INVENTION

1. Field of the Invention

The present invention relates to a Faraday rotator, an opto-isolator, and a laser processing apparatus. In particular, the present invention relates to a Faraday rotator that can be suitably used when a polarization-independent opto-isolator is used, an opto-isolator using the Faraday rotator, and a laser processing apparatus including the opto-isolator.

2. Description of the Related Art

As shown in FIG. 6, a conventional laser processing apparatus includes an opto-isolator 111 to stabilize a light source and prevent breakage by blocking optical feedback caused by reflection. The opto-isolator 111 includes, in sequence, a first polarizer 102, a Faraday rotator 103, a wave plate 104, and a second polarizer 105 in a traveling direction of a laser beam FB.

Here, the conventional Faraday rotator 103 includes an element causing the Faraday effect and a magnet (not shown). A crystal causing the Faraday effect, such as $TiO_2$ (rutile), $CaCO_3$ (calcite), $\alpha$-BBO, or $YVO_4$, and the like are used as the element causing the Faraday effect. The magnet is disposed such that a line of magnetic force of the magnet is generated in parallel with an optical path of the laser beam FB.

Patent Literature 1: Japanese Patent Laid-open Publication No. Heisei 6-34926

However, as shown in FIG. 7, when a high-output laser beam FB of 100 W or more is transmitted through the Faraday rotator 103, a problem occurs in that the temperature of the Faraday rotator 103 rises, and polarization rotation angle changes. When the polarization rotation angle changes, transmittance and extinction ratio of the opto-isolator 111 become unstable. This problem becomes particularly serious when a high-output laser beam FB of 500 W or more is transmitted through the Faraday rotator 103.

The ambient temperature in which the Faraday rotator 103, the opto-isolator 111, and the laser processing apparatus are used is ordinarily 0° C. to 50° C. The temperature of the Faraday rotator 103 also changes as a result of change in the ambient temperature. Therefore, even when a low-output laser beam FB is transmitted through the Faraday rotator 103, a problem occurs in that the polarization rotation angle changes, and the transmittance and the extinction ratio of the opto-isolator 111 become unstable.

SUMMARY OF THE INVENTION

Therefore, the present invention has been achieved in light of the above-described issues. An object of the present invention is to provide a Faraday rotator, an opto-isolator, and a laser processing apparatus that can suppress temperature change in the Faraday rotator and prevent change in polarization rotation angle, even when a laser beam output increases or the ambient temperature changes.

In order to achieve the aforementioned object, a Faraday rotator according to a first aspect of the present invention includes a crystal cylinder formed into a cylinder using a crystal that rotates polarized light, and a cooling section that cools a side face of the crystal cylinder using a circulating cooling medium.

In the Faraday rotator according to the first aspect, because the side face of the crystal cylinder is cooled by the cooling section, excessive increase in the temperature of the crystal cylinder can be prevented. As a result, polarization rotation angle of the Faraday rotator can be maintained at a constant angle.

A Faraday rotator according to a second aspect of the invention includes a crystal cylinder formed into a cylinder using a crystal that rotates polarized light, an enclosing tube surrounding a side face of the crystal cylinder, two cooling tubes, passages formed within the cooling tubes, a cooling medium, and a magnet disposed in an outer periphery of the enclosing tube. The two cooling tubes are each sized and positioned to allow both ends of an outer peripheral surface of the crystal cylinder to be inscribed within the cooling tubes and both end sections of an inner peripheral surface of the enclosing tube to be circumscribed around the cooling tubes. The cooling medium circulates through a space formed among the crystal cylinder, the enclosing tube, and the two cooling tubes, and the passages.

In the Faraday rotator according to the second aspect, a coolant supplied from the passages in the cooling tubes into the space directly cools the side face of the crystal cylinder. Therefore, increase in the temperature of the crystal cylinder can be prevented. Moreover, because the coolant circulates through the space formed between the enclosing tube and the two cooling cylinders and the passages, cooling effect can be maintained. The temperature of the crystal cylinder can be maintained at a constant temperature.

A Faraday rotator according to a third aspect is the Faraday rotator according to the second aspect, in which each cooling tube has a flange at an end section on a side opposite of the side within which the crystal cylinder is inscribed. A cylindrical sealing case is disposed such as to cover the entire Faraday rotator along a peripheral edge of the flange of each cooling tube. The magnet is disposed in a position sandwiched by the flanges of the two cooling tubes, the enclosing tube, and the sealing case.

In the Faraday rotator according to the third aspect, the magnet can be fixed onto an outer peripheral surface of the enclosing tube through use of the flanges of the cooling tubes and the sealing case. As a result of the sealing case being attached, dust-proofing effects can be expected. Therefore, desired performance can be achieved even in a disadvantageous environment, such as that in which an industrial laser is used.

A Faraday rotator according to a fourth aspect is the Faraday rotator according to the second or third aspect, in which the cooling tubes have sealing components in contacting sections with the crystal cylinder and contacting sections with the enclosing tube.

In the Faraday rotator according to the fourth aspect, the coolant can be prevented from leaking outside of the passages, from between the cooling tube and the crystal cylinder, or between the cooling tube and the enclosing tube. As a result of the thickness of the sealing components being changed accordingly, dimensional allowance of the cooling tubes can be set to a large value. The cooling tubes can be easily formed.

A Faraday rotator according to a fifth aspect is the Faraday rotator according to the second aspect, in which the enclosing tube and the cooling tubes are formed using non-magnetic material.

In the Faraday rotator according to the fifth aspect, adverse effect on the magnet by the enclosing tube and the cooling tubes can be prevented.

A Faraday rotator according to a sixth aspect is the Faraday rotator according to the second aspect, in which the crystal cylinder rotates polarized light by 45 degrees. A $\lambda/2$ wave plate is disposed in a position in contact with the cooling tube, on an optical path of light emitted from the crystal cylinder.

In the Faraday rotator according to the sixth aspect, the λ/2 wave plate is also cooled in addition to the crystal cylinder. Therefore, increase in the temperature of the λ/2 wave plate, in addition to the temperature of the crystal cylinder, can be prevented.

In order to achieve the aforementioned object, an opto-isolator according to a first aspect of the present invention includes a Faraday rotator according to the first or second aspect, and two polarizers. The two polarizers are respectively disposed on an optical path of light entering the Faraday rotator and an optical path of light exiting the Faraday rotator.

In the opto-isolator according to the first aspect, excessive increase in the temperature of the Faraday rotator can be prevented, and a constant temperature can be maintained. Therefore, stable transmittance and extinction ratio can be achieved in the crystal cylinder. As a result, the opto-isolator using the Faraday rotator can achieve stable isolation functions (such as transmittance and extinction ratio).

In order to achieve the aforementioned object, a laser processing apparatus according to a first aspect of the present invention includes the opto-isolator according to the first aspect.

In the laser processing apparatus according to the first aspect, excessive increase in the temperature of the opto-isolator can be prevented, and a constant temperature can be maintained. Therefore, isolation functions (such as transmittance and extinction ratio) of the opto-isolator can be stabilized. As a result, stable laser output can be achieved in the laser processing apparatus according to the first aspect that uses the opto-isolator.

In the Faraday rotator, the opto-isolator, and the laser processing apparatus of the present invention, temperature rise in the Faraday rotator is prevented, and the temperature is maintained at a constant temperature. Therefore, advantageous effects can be achieved in that, even when a laser beam output increases or the ambient temperature changes, temperature change in the Faraday rotator can be suppressed, and change in polarization rotation angle can be prevented.

BRIEF DESCRIPTION OF THE DRAWINGS

FIG. 1 is a schematic diagram of a laser processing apparatus according to an embodiment;

FIG. 2 is a schematic diagram of when a fiber laser beam enters an opto-isolator according to the embodiment;

FIG. 3 is a cross-sectional view of a Faraday rotator according to the embodiment;

FIG. 4 is a cross-section view taken from line A-A in FIG. 3;

FIG. 5 is a schematic diagram of when a return beam enters the opto-isolator according to the embodiment;

FIG. 6 is a schematic diagram of an example of a conventional opto-isolator; and FIG. 7 is a schematic diagram of a state in which a high-output laser beam of 500 W or more is transmitted through the conventional opto-isolator.

DETAILED DESCRIPTION OF THE PREFERRED EMBODIMENT

An embodiment of a Faraday rotator, an opto-isolator, and a laser processing apparatus of the present invention will be described.

FIG. 1 is a diagram of a laser processing apparatus 1 according to the embodiment. The laser processing apparatus 1 of the present invention includes, in sequence, a laser oscillating section 21, an opto-isolator 11, an incident unit 14, a transmission optical fiber 16, an output unit 18, and a processing table 20 in a traveling direction of a laser beam.

The laser oscillating section 21 includes a fiber laser oscillator 10 and a laser power supply 12 controlled by the controller board 62. The fiber laser oscillator 10 includes a laser diode (LD) 30 and a resonator 23 provided in an electro-optical excitation section 24. The resonators 23 and 25 mainly include a pair of resonator mirrors 26 and 28, a pair of optical lenses 32 and 34, an oscillating fiber 22, and the like. The pair of optical lenses 32 and 34, and the oscillating fiber 22 are disposed between the resonator mirrors 26 and 28. The oscillating fiber 22 includes a core and a cladding (not shown). The core serves as an active medium. The cladding serves as an optical propagation path for an excitation laser beam MB. A reflecting mirror 36, a laser absorber 38, a beam splitter 40, a condenser lens 44, and a photodiode (PD) 42 are provided downstream from the resonator 23. The resonator mirrors 26 and 28, and the reflecting mirror 36 are partially reflective mirrors.

The beam splitter 40 is a mirror that reflects a portion (such as 1%) of a fiber laser beam FB in a predetermined direction. The PD 42 is disposed on an optical path of the reflected light from the beam splitter 40. The condenser lens 44 is disposed between the beam splitter 40 and the PD 42 on the optical path of the reflected light from the beam splitter 40.

FIG. 2 is a diagram of the opto-isolator 11 according to the embodiment. As shown in FIG. 1, the opto-isolator 11 according to the embodiment is a polarization-independent opto-isolator 11 that transmits the fiber laser beam FB traveling in a forward direction from the laser oscillating section 21 side and removes a return beam RB reflected from a workpiece 60 side. The opto-isolator 11 includes, in sequence from a left-hand side of FIG. 2, a first polarizer 2, a Faraday rotator 3, a λ/2 wave plate 4, and a second polarizer 5 on the optical path of the fiber laser beam FB.

As shown in FIG. 2, the first polarizer 2 is an optical element that divides the fiber laser beam FB into a P polarization component P and an S polarization component S. The P polarization component P and the S polarization component S are two polarization components of which respective polarization planes intersect and are propagated in parallel. A polarization beam splitter 2a and a full reflective mirror 2b are used as the first polarizer 2.

FIG. 3 is a cross-sectional view of the Faraday rotator 3. FIG. 4 is a cross-sectional view taken from line A-A in FIG. 3. As shown in FIG. 3 and FIG. 4, the Faraday rotator 3 includes a crystal cylinder 6, an enclosing tube 7, two cooling tubes 8, and a plurality of magnets 9. The crystal cylinder 6 is positioned in the center of the Faraday rotator 3. The enclosing tube 7 encases the crystal cylinder 6.

The crystal cylinder 6 is formed into a cylinder using crystal that rotates polarized light by a predetermined angle. According to the embodiment, polarization rotation angle is set to 45 degrees. As the crystal used in the crystal cylinder 6, a crystal is selected that transmits polarized light and causes the Faraday effect. Specifically, a garnet, such as terbium gallium garnet (TGG), is selected as the crystal.

The enclosing tube 7 is formed into a tube having an inner diameter that is greater than a diameter of the crystal cylinder 6. The enclosing tube 7 is disposed in a position surrounding the side face of the crystal cylinder 6. The enclosing tube 7 is preferably formed using a non-magnetic material. Specifically, non-magnetic glass is selected as the material.

The two cooling tubes 8 are disposed at each end of the crystal cylinder 6. As shown in FIG. 3 and FIG. 4, each cooling tube 8 includes a cylindrical base section 8a, a flange 8b, and an end plate 8c. As shown in FIG. 3, the base section 8a has an inner diameter that is equivalent to the diameter of the crystal cylinder 6, and an outer diameter equivalent to the inner diameter of the enclosing tube 7. Each base section 8a is disposed such that both ends of an outer peripheral surface of the crystal cylinder 6 are inscribed within the end section of the base sections 8a opposite of the flange 8b. In addition, both ends of an inner peripheral surface of the enclosing tube 7 are circumscribed around the end section of the base sections 8a opposite of the flange 8b. As shown in FIG. 3, the flange 8b is formed into a circular shoulder-shape that widens from an outer end of the base section 8a in an outward direction. The end plate 8c covers the outer end surface of the flange 8b. The cooling tubes 8 each including the base section 8a, the flange 8b, and the end plate 8c are preferably formed using a non-magnetic material. Specifically, austenitic stainless steel is selected as the material.

Rubber packings 17 are provided as sealing components in the base sections 8a of the cooling tubes 8, at a contacting section with the crystal cylinder 6 and a contacting section with the enclosing tube 7. According to the embodiment, O-rings are used as the rubber packings 17. The O-rings are provided on the inner peripheral surfaces and the outer peripheral surfaces of the cooling tubes 8. As a result of the O-rings 17 being provided, the contacting sections between the crystal cylinder 6 and the cooling tubes 8 and the contacting sections between the enclosing tube 7 and the cooling tubes 8 can be hermetically sealed.

As shown in FIG. 3 and FIG. 4, numerous circular passages 13 are formed within the cooling tube 8, from the outer end surface of the flange 8b to the inner end surface of the base section 8a. The circular passages 13 are formed in an axial direction, such as to be evenly spaced in the circumferential direction. Here, a ring-shaped passage 13a is formed on the outer end surface of the flange 8b, such as to pass through all passages 13 in the axial direction. The end plate 8c covers the outer side of the ring-shaped passage 13a. Circular inlet and outlet passages 13b are provided in two areas, symmetrically in the radial direction. A coolant 15 serving as a cooling medium is forcibly circulated over the passages 13, 13a, and 13b by a pump (not shown). A ring-shaped space LS between the outer peripheral surface of the crystal cylinder 6 and the inner peripheral surface of the enclosing tube 7 and sandwiched between the inner end surfaces of the two cooling tubes 8 is directly connected to the passages 13. Therefore, the coolant 15 also flows into and out of the ring-shaped space LS. Coolant water set to 10° C. to 20° C. is used as the coolant 15.

As shown in FIG. 3 and FIG. 4, the plurality of magnets 9 are disposed such that two column shaped magnets formed having a roughly trapezoidal cross-section are disposed in series and integrated. The magnets 9 are disposed surrounding the outer peripheral surface of the enclosing tube 7 such that a direction of the line of magnetic force of the two magnets 9 is parallel with the axial direction of the crystal cylinder 6. Because the two cooling tubes 8 each include the flange 8b, as shown in FIG. 3, the plurality of magnets 9 are disposed in a position sandwiched between the two flanges 8b and the enclosing tube 7.

A sealing case 3a is formed into a cylinder having an inner diameter that is equivalent to the diameter of the outer side of the flange 8b. The sealing case 3a is fixed to the flanges 8b such as to cover the entire Faraday rotator 3, along the peripheral edges of the flanges 8b of the two cooling tubes 8. Plastic is selected as a material used to form the sealing case 3a.

As shown in FIG. 2, the λ/2 wave plate 4 is disposed on an optical path of polarization-rotated P polarization component P' and S polarization component S' emitted from the crystal cylinder 6. As shown in FIG. 2, the λ/2 wave plate 4 can be disposed separately from the cooling tube 8 on the outgoing light side of the Faraday rotator 3. Alternatively, as shown in FIG. 3, the λ/2 wave plate 4 can be disposed such as to be integrally fixed to the cooling tube 8. As a fixing means of the λ/2 wave plate 4, as indicated by chain lines in FIG. 3, the λ/2 wave plate 4 can be sandwiched and held by the end plate 8c of the cooling tube 8 and a ring-shaped, outer fixing plate 4a disposed on the outer side of the cooling tube 8. A ring-shaped passage 13c can be formed on the end plate 8c of the cooling tube 8 to allow the ring-shaped passage 13a provided on the flange 8b to run to the λ/2 wave plate 4. The outer fixing plate 4a can, for example, be screwed onto the end plate 8c of the cooling tube 8 or the sealing case 3a. Two through-holes 13d communicating with the inlet and outlet passages 13b can be formed. To prevent the coolant 15 from leaking, a sealing component (not shown), such as a rubber packing, can be provided as required. A quartz crystal wave plate can be used as the λ/2 wave plate 4.

As shown in FIG. 2, the second polarizer 5 is an optical element that combines the P polarization component P and the S polarization component S obtained by the fiber laser beam FB passing through the λ/2 wave plate 4. Like the first polarizer 2, a polarization beam splitter 5a and a full reflective mirror 5b are used as the second polarizer 5.

As shown in FIG. 1, the incident unit 14 includes a bent mirror 46 and a condenser lens 50 in the optical element 48. As the transmission optical fiber 16 with cladding 52, a step index (SI) fiber is selected. As shown in FIG. 1, the output unit 18 includes an optical element 54 including a collimating lens 56 and a condenser lens 58.

Next, operations of the Faraday rotator 3, the opto-isolator 11, and the laser processing apparatus 1 according to the embodiment will be described.

As shown in FIG. 1, when an excitation current is supplied from the laser power supply 12 of the laser oscillating section 21 to the LD 30 of the fiber laser oscillator 10, the LD 30 oscillates the excitation laser beam MB for pumping. When the excitation laser beam MB is irradiated from the LD 30, the resonator mirror 26 transmits the excitation laser beam MB entering from the LD 30 side and fully reflects an oscillating beam entering from the oscillating fiber 22 side. The optical lens 32 concentrates the excitation laser beam MB and irradiates the excitation laser beam MB onto one end surface of the oscillating fiber 22. The optical lenses 32 and 34 collimate the oscillating beam emitted from the end surface of the oscillating fiber 22 into collimated light.

The excitation laser beam MB incident on the one end surface of the oscillating fiber 22 is propagated in an axial direction through the oscillating fiber 22 while being confined as a result of full reflection by the outer peripheral boundary surface of the cladding. As the excitation laser beam MB is propagated, ions in the core are photoexcited as a result of the excitation laser beam MB crossing over the core numerous times. As a result, an oscillating beam of a predetermined wavelength is emitted in the axial direction from both end surfaces of the core. The oscillating beam is resonated and amplified as a result of moving back and forth between the resonator mirrors 26 and 28 numerous times. The fiber laser beam FB of a predetermined wavelength is obtained when the oscillating beam passes through the resonator mirror 28.

The fiber laser beam FB outputted from the resonator mirror 28 passes straight through the reflecting mirror 36. The fiber laser beam FB then enters the opto-isolator 11 after passing through the beam splitter 40. On the other hand, when the excitation laser beam MB passes through the optical lens 34 and the resonator mirror 28 before the fiber laser beam FB of the predetermined wavelength is obtained, the excitation laser beam MB is turned back towards the direction of the laser absorber 38 by the reflecting mirror 36.

The beam splitter 40 reflects a portion, such as 1%, of the incident fiber laser beam FB towards the PD 42 side. The condenser lens 44 condenses the reflected fiber laser beam FB. The PD 42 photoelectrically converts the reflected fiber laser beam FB and outputs an electrical signal of the laser output. The electrical signal is sent to the laser power supply 12.

In the manner described above, the excitation laser beam MB crosses over the core numerous times within the oscillating fiber 22 and exhausts excitation energy. Therefore, the fiber laser beam FB can be generated with high lasing efficiency. As a result, enhanced processing efficiency achieved by a high-output fiber laser beam FB of 500 W or more can be expected. Because the fiber laser beam FB output can be accurately grasped by the PD 42, temperature increase in the opto-isolator 11 can be more easily predicted.

As shown in FIG. 1, when the fiber laser beam FB enters the opto-isolator 11, as shown in FIG. 2, the first polarizer 2 divides the fiber laser beam FB into two polarization components, the P polarization component P and the S polarization component S. When the P polarization component P and the S polarization component S generated by the first polarizer 2 pass through the crystal cylinder 6 of the Faraday rotator 3, respective polarization planes rotate by 45 degrees. The λ/2 wave plate 4 located on the back side of the optical path when viewed from the crystal cylinder 6 rotates the polarization components that are passing through in an axially symmetrical manner, with an optical axis direction N as reference. Therefore, when the P polarization component P' and the S polarization component S' of which respective polarization planes are rotated by 45 degrees pass through the λ/2 wave plate 4, the polarization-rotated P polarization component P' is converted to the S polarization component S, and the polarization-rotated S polarization component S' is converted to the P polarization component P. The mutually converted S polarization component S and P polarization component P are reintegrated into the fiber laser beam FB on the same optical path by the second polarizer 5.

On the other hand, as shown in FIG. 5, when the return beam RB generated by the fiber laser beam FB being reflected enters the second polarizer 5, the second polarizer 5 divides the return beam RB into the P polarization component P and the S polarization component S. The λ/2 wave plate 4 rotates the P polarization component P and the S polarization component S of the return beam RB in an axially symmetrical manner, with the optical axis direction N as reference. However, the Faraday rotator 3 rotates the P polarization component P' and the S polarization component S' of the return beam RB, rotated by passing through the λ/2 wave plate 4, by 45 degrees in a similar direction as that when the fiber laser beam FB enters the Faraday rotator 3. Therefore, the P polarization component P' and the S polarization component S' rotated by the λ/2 wave plate 4 is returned to the P polarization component P and the S polarization component S. In other words, the Faraday rotator 3 does not convert the P polarization component P to the S polarization component S or the S polarization component S to the P polarization component P. Therefore, instead of emitting the P polarization component P and the S polarization component S that have been returned to their initial state to the laser oscillating section 21 side, the first polarizer 2 emitting the return beam RB in the perpendicular direction and removes the return beam RB from the optical path of the fiber laser beam FB.

Here, the Faraday rotator 3 according to the embodiment is expected to be used under circumstances in which a high-output fiber laser beam FB is used or the ambient temperature changes. Therefore, in the Faraday rotator 3 according to the embodiment, as shown in FIG. 3 and FIG. 4, the coolant 15 supplied from the passages 13 of the cooling tubes 8 to the ring-shaped space LS between the crystal cylinder 6 and the enclosing tube 7 directly cools the side face of the crystal cylinder 6. As a result, excessive increase in the temperature of the crystal cylinder 6 can be prevented, and a constant temperature can be maintained. When the temperature of the crystal cylinder 6 is maintained at a constant temperature, the temperature of the Faraday rotator 3 can be maintained at a constant temperature. Therefore, even when the fiber laser beam FB output increases or the ambient temperature changes, temperature change in the Faraday rotator 3 can be suppressed, and change in the polarization rotation angle can be prevented.

As shown in FIG. 3, in the Faraday rotator 3, the rubber packings 17 are interposed in the contacting section with the crystal cylinder 6 and the contacting section with the enclosing tube 7. Therefore, the sealed state of the coolant 15 can be enhanced. Even when the coolant 15 comes into direct contact with the side face of the crystal cylinder 6, the coolant 15 can be prevented from leaking. When the thickness of the rubber packing 17 is changed accordingly, dimensional allowance of the cooling tubes 8 can be set to a large value. Therefore, the cooling tubes 8 can be easily formed.

The magnets 9 are disposed on the outer side of the enclosing tube 7, between the enclosing tube 7 and the flanges 8b of the cooling tubes 8. The sealing case 3a is disposed such as to cover the entire Faraday rotator 3, along the peripheral edges of the flanges 8b. Therefore, the magnets 9 can be fixed onto the outer peripheral surface of the enclosing tube 7 using the flanges 8b of the cooling tubes 8 and the sealing case 3a. Because the enclosing tube 7 is made of glass and the cooling tubes 8 are made of austenite stainless steel, adverse effects on the magnets 9 by the enclosing tube 7 and the cooling tubes 8 can be prevented. In addition, taking into consideration corrosion and presence of magnetism, the enclosing tube 7 and the cooling tubes 8 can be formed such as to be light in weight and low in cost.

The sealing case 3a is disposed such as to cover the magnets 9 along the flange 8b. Therefore, dust-proofing effects can be expected. Desired performance can be achieved even in a disadvantageous environment, such as that in which an industrial laser is used.

Moreover, use under circumstances in which a high-output fiber laser beam FB is used or the ambient temperature changes may cause change in the polarization rotation angle in the λ/2 wave plate 4. Therefore, as indicated by the chain lines in FIG. 3, the λ/2 wave plate 4 is preferably fixed to a position in contact with the cooling tube 8. In this case, the coolant 15 passes through the ring-shaped passages 13a and 13c formed on the flange 8b and the end plate 8c of the cooling tube 8. The coolant 15 comes into direct contact with the λ/2 wave plate 4, thereby cooling the λ/2 wave plate 4. As a result, the λ/2 wave plate 4 can be cooled, in addition to the crystal cylinder 6. Therefore, the temperature of the λ/2 wave plate 4 can be maintained at a constant temperature, in addition to the temperature of the crystal cylinder 6.

When the fiber laser beam FB supplied from the fiber laser oscillator 10 passes through the opto-isolator 11, the fiber laser beam FB is condensed and irradiated onto a processing point W of the workpiece 60 placed on the processing table 20, after passing through the incident unit 14, the transmission optical fiber 16, and the output unit 18. For example, when the fiber laser beam FB is used for laser welding, the workpiece 60 melts at the processing point W as a result of the energy from the fiber laser beam FB. After irradiation of the fiber laser beam FB is completed, the melted workpiece 60 solidifies and a nugget is formed. At this time, because the Faraday rotator 3 is always maintained at a constant temperature, transmittance and extinction ratio of the isolator do not deteriorate. A fiber laser beam FB of a constant output is constantly supplied to the processing point W of the workpiece 60.

In other words, in the Faraday rotator 3, the opto-isolator 11, and the laser processing apparatus 1 according to the embodiment, the temperature of the Faraday rotator 3 is maintained at a constant temperature. Therefore, even when the laser beam output increases or the ambient temperature changes, temperature change in the Faraday rotator 3 can be suppressed, and change in the polarization rotation angle can be prevented.

The present invention is not limited to the above-described embodiment. Various modifications can be made as required.

For example, the Faraday rotator 3 according to the embodiment is configured using predetermined components. However, according to another embodiment, the Faraday rotator 3 is merely required to include at least the crystal cylinder 6 and a predetermined cooling section. As the predetermined cooling section, all that is required is that a circulating coolant 15 is used to cool the side face of the crystal cylinder 6.

What is claimed is:

1. A Faraday rotator comprising:
   a crystal cylinder formed into a cylinder using a crystal that rotates polarized light;
   an enclosing tube surrounding a side face of the crystal cylinder;
   two cooling tubes each sized and positioned to allow both ends of an outer peripheral surface of the crystal cylinder to be inscribed within the cooling tubes and both end sections of an inner peripheral surface of the enclosing tube to be circumscribed around the cooling tubes;
   passages formed within the cooling tubes;
   a cooling medium circulating through a space formed among the crystal cylinder, the enclosing tube, and the two cooling tubes, and the passages; and
   a magnet disposed in an outer periphery of the enclosing tube.

2. The Faraday rotator according to claim 1, wherein:
   each cooling tube has a flange at an end section on a side opposite of the side within which the crystal cylinder is inscribed,
   a cylindrical sealing case is disposed such as to cover the entire Faraday rotator along a peripheral edge of the flange of each cooling tube, and
   the magnet is disposed in a position sandwiched by the flanges of the two cooling tubes, the enclosing tube, and the sealing case.

3. The Faraday rotator according to claim 1 or 2, wherein the cooling tubes have sealing components in contacting sections with the crystal cylinder and contacting sections with the enclosing tube.

4. The Faraday rotator according to claim 1, wherein the enclosing tube and the cooling tubes are formed using non-magnetic material.

5. The Faraday rotator according to claim 1, wherein:
   the crystal cylinder rotates polarized light by 45 degrees, and
   a $\lambda/2$ wave plate is disposed in a position in contact with the cooling tube, on an optical path of light emitted from the crystal cylinder.

6. An opto-isolator comprising:
   a Faraday rotator according to claim 1; and
   two polarizers respectively disposed on an optical path of light entering the Faraday rotator and an optical path of light exiting the Faraday rotator.

7. A laser processing apparatus comprising:
   an opto-isolator according to claim 6.

* * * * *